(12) United States Patent
Bombolowsky et al.

(10) Patent No.: US 9,262,556 B2
(45) Date of Patent: Feb. 16, 2016

(54) EMBEDDED SEARCH RESULTS WITHIN THE CONTEXT OF A PROCESS

(71) Applicants: Jens Bombolowsky, Schwetzingen (DE); Marco Sachs, Walldorf (DE)

(72) Inventors: Jens Bombolowsky, Schwetzingen (DE); Marco Sachs, Walldorf (DE)

(73) Assignee: SAP SE, Walldorf (DE)

( * ) Notice: Subject to any disclaimer, the term of this patent is extended or adjusted under 35 U.S.C. 154(b) by 533 days.

(21) Appl. No.: 13/692,913

(22) Filed: Dec. 3, 2012

(65) Prior Publication Data
US 2014/0156640 A1 Jun. 5, 2014

(51) Int. Cl.
*G06F 17/30* (2006.01)
*G06Q 30/00* (2012.01)
*G06Q 10/06* (2012.01)

(52) U.S. Cl.
CPC ........ *G06F 17/30991* (2013.01); *G06Q 10/067* (2013.01)

(58) Field of Classification Search
CPC ................... G06F 17/30991; G06F 17/30979; G06Q 10/067
See application file for complete search history.

(56) References Cited

U.S. PATENT DOCUMENTS

| | | | |
|---|---|---|---|
| 7,111,243 B1 * | 9/2006 | Ballard et al. | 715/744 |
| 8,494,886 B2 * | 7/2013 | Koerner | 705/7.27 |
| 2007/0299679 A1 * | 12/2007 | Sudan et al. | 705/1 |

* cited by examiner

*Primary Examiner* — Cheryl Lewis
(74) *Attorney, Agent, or Firm* — Mintz Levin Cohn Ferris Glovsky and Popeo, P.C.

(57) ABSTRACT

In one aspect, there is provided a method. The method may include receiving, from a user interface, an indication and a search term to be identified in one or more steps of a business process, the indication being representative of a search result format for an embedded context search; initiating a search for the search term in one or more steps of a business process; receiving one or more search results including metadata describing where the one or more search results are located in the business process; and generating a first page including the one or more steps of the business process, the first page further including the one or more search results embedded within the one or more steps to provide a context, when the indication representative of the search result format comprises the embedded context search. Related systems, methods, and articles of manufacture are also disclosed.

14 Claims, 8 Drawing Sheets

EMBEDDED SEARCH RESULTS WITHIN THE CONTEXT OF A PROCESS

TECHNICAL FIELD

The subject matter described herein relates generally to data processing.

BACKGROUND

The inherent complexity of business scenarios, which can include one or more business processes having tasks (also referred to as steps, sub-steps, work items, and/or activities), and their implementation in business software solutions, enterprise resource planning (ERP) systems, and the like can present substantial challenges to users and can be a serious obstacle to widespread operative use of process and scenario models in the software landscape. Moreover, complex business processes may include dozens, if not hundreds or more, of steps, associated objects, and users, making it difficult to manage.

SUMMARY

In one aspect, there is provided a method. The method may include receiving, from a user interface, an indication and a search term to be identified in one or more steps of a business process, the indication being representative of a search result format for an embedded context search; initiating a search for the search term in one or more steps of a business process; receiving one or more search results including metadata describing where the one or more search results are located in the business process; and generating a first page including the one or more steps of the business process, the first page further including the one or more search results embedded within the one or more steps to provide a context, when the indication representative of the search result format comprises the embedded context search.

In some variations one or more of the following features can optionally be included in any feasible combination. The indication may be received based on a selection made at the user interface. The embedded context search may represent associating each of the one or more search results with a corresponding location in the business process. The generating may further comprise generating a first window and a separate second window, wherein the first window includes the one or more search results, and the second window includes the one or more steps of the business process. The generating may further comprise generating a window including the one or more steps of the business process, wherein the one or more search results are represented with a graphic element on, or proximate to, the one or more search results.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

When a search is performed, the search results are typically displayed as a separate, flat list of results divorced from the underlying structure of the objects associated with the results. Although the flat list of search results may be useful when performing a simple search, it may make it difficult to search through complex business processes having a plurality of steps and substeps modeled as a process, such as a business process in a business system, as the flat search results list may not provide the context of the search results within the business process. The subject matter disclosed herein relates to providing search results embedded within the context of the business process, so that when a user navigates through the business process, the search results are presented embedded within the context of the business process.

Figure 1A:
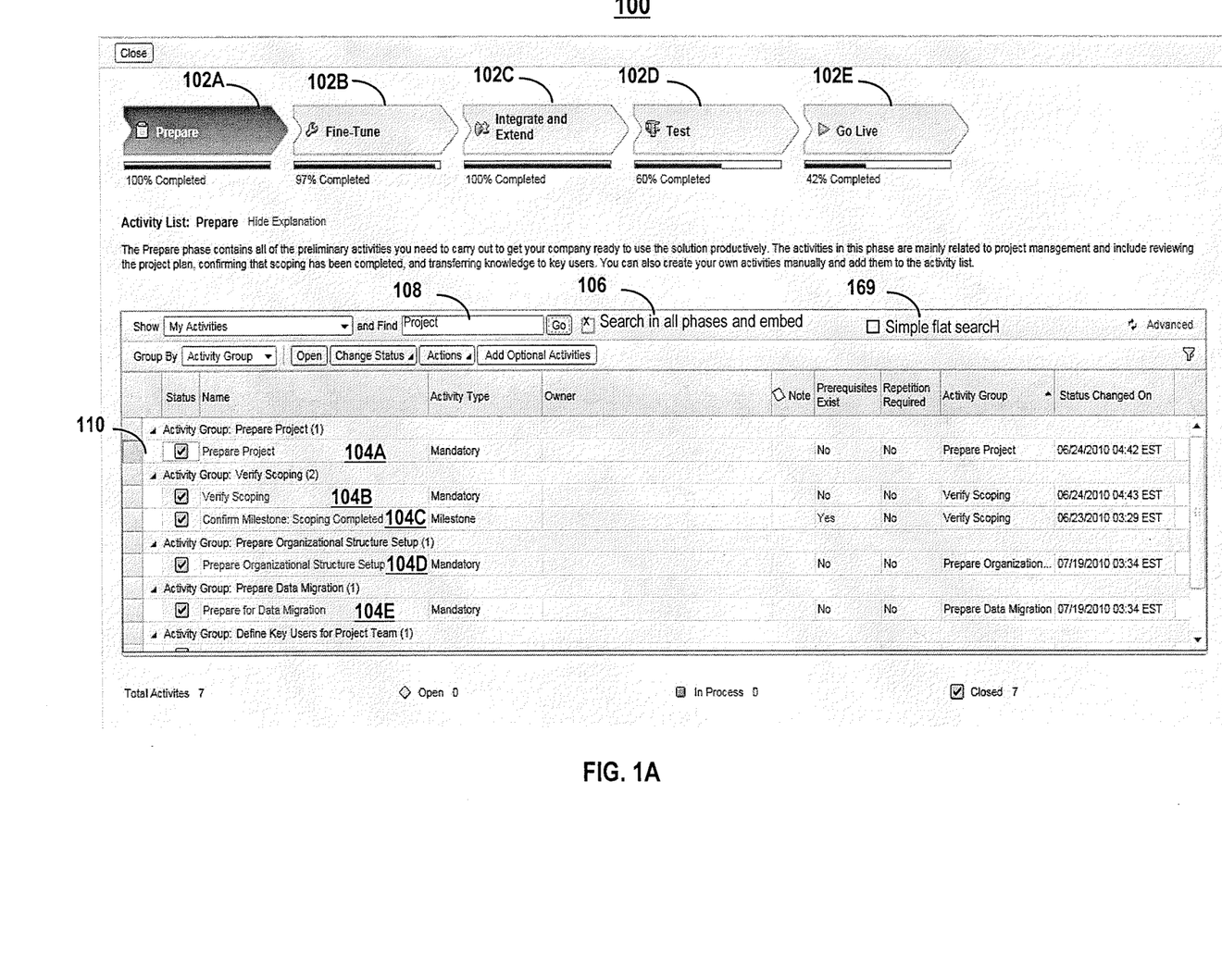
FIGS. 1A, 1B, 2A, and 2B show examples of views generated to guide a user through a complex business process while presenting embedded search results, in accordance with some example implementations.

FIG. 1A discloses a page 100 in accordance with some example implementations. Page 100 may be presented at a user interface of a business system configured to provide a business process. In the example of FIG. 1A, the business process includes the following steps: prepare 102A, fine tune 102B, integrate and extend 102C, test 102D, and go live 102E, although other types of, and quantities of, steps may be used as well. Each of the steps 102A-E may include additional steps (also referred to as substeps).

In the example of FIG. 1A, the first step prepare 102A is selected, so the business system provides at page 100 substeps 104A-E comprising activities associated with the prepare step 102A. The business system may include a process model defining the process 102A-E and the substeps associated with each process step, and a process monitor to monitor the status of completion of the steps 102A-E and substeps. Moreover, the process model may also define the objects, such as documents, applications, data items, databases, and the like, associated with the process and/or the role (or identity) of users associated with each of the steps/substeps. For example, if a certain step/substep requires identifying a sales lead by a sales representative, the process model may associate this step/substep with a sales lead form stored in a database and business system users having the role of sales representative. Moreover, the process model may store the temporal relationship between steps and substeps including conditions precedent to initiating a step/substep, conditions for exiting a step/substep, and the like.

In the example of FIG. 1A, a selection is made at 106 to search all phases of a process including steps 102A-E for the term "Project" 108. This selection initiates a search having search results embedded within the context of the business process. Specifically, a user interface may send an indication of selection 106 to a business system configured to manage a process including steps 102A-E. When business system receives the indication, the business system initiates a search of all of the steps and substeps of process 102A-E. Rather than provide the search results as a simple flat file, the selection at 106 signals to the business system that the search results should be embedded within the process steps 102A-E to maintain the context of the search results within the structure of process 102A-E. As such, a user can see the search results 110 embedded within the context of the sequence of the substeps 104A-E associated with step 102A. Although FIG. 1A depicts the search results 110 as a graphical element comprising a shaded square element, any other graphical element may be used to convey embedded search results at page 100.

Figure 1B:
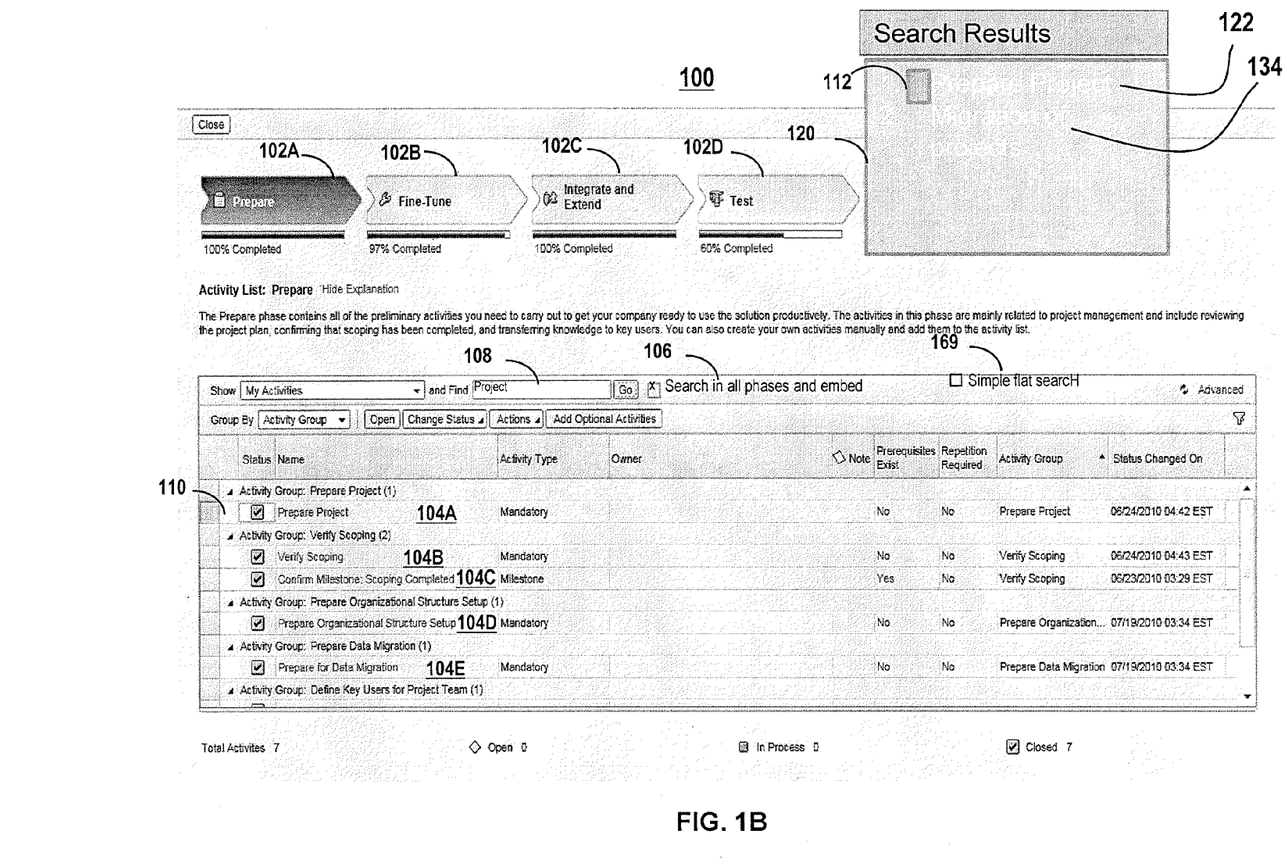

FIG. 1B depicts page 100 with the addition of a window 120 indicating all of the search results but only the search result in the step being viewed at page 100 is highlighted. For example, the search for the term "Project" across steps 102A-E results in two search results "Prepare Project" 122 and "Migration of Projects" 134. However, only "Prepare Project" 122 is relevant to the current context of steps 102A and substeps 104A-E as indicated by graphical element 112. The other search result "Migration of Projects" 134 is relevant to another step currently not being viewed (or accessed) on a page containing the other step and its substeps so the "Migration of Projects" 134 substep is not highlighted or otherwise flagged. Accordingly, a user can see the search results 122 and 134 and understand the context of the search results with the sequence of the steps 102A-E.

In some implementations, a selection at "Migration of Projects" 134 may cause a page containing the substeps associated with "Migration of Projects" 134. In the example of FIG. 1B, selection of a subsequent step 102C of the process and/or "Migration of Projects" 134 may cause the business system to generate page 199 depicted at FIG. 2A.

Figure 2A:
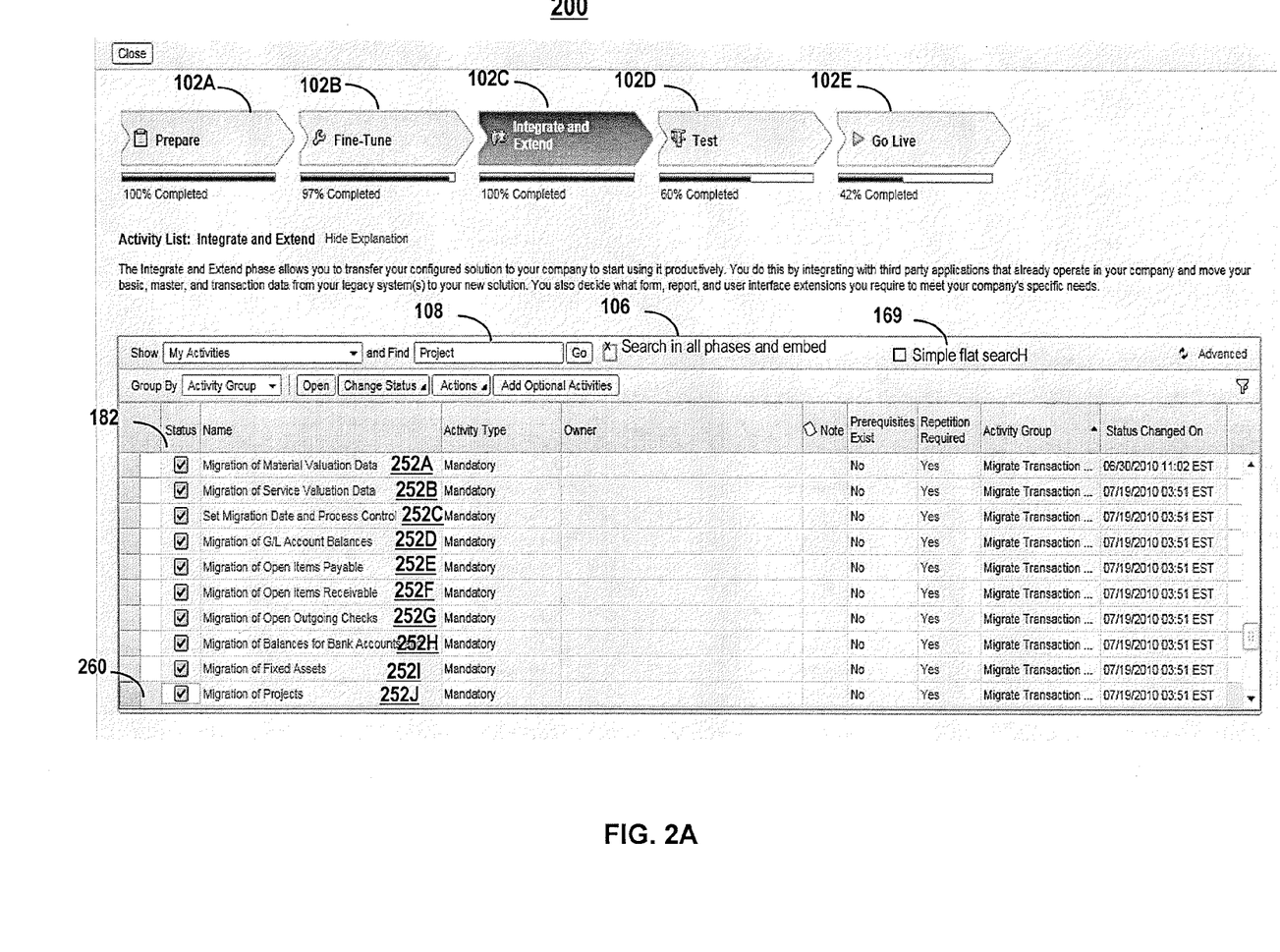

Referring to FIG. 2A, page 200 is similar to page 100 but depicts the substeps 252A-J for the "Integrate and Extend" step 102C. Rather than provide a simple flat file with the search results for "Project," the selection of a subsequent step 102C of the process, "Migration of Projects" 134, and "search all phases" 106 signals to the business system that the search results should be embedded within substeps 252A-J to maintain the context of the search results within process 252A-J. In the example of FIG. 2A, the search result for "Project" is indicated at graphical element 260 within the process 252A-J. As such, a user can see the search results embedded within the context of the sequence of the substeps 252A-J. Although FIG. 2A depicts the graphical element 260 as a shaded square element, any other graphical element may be used to convey the search results at page 200. However, in some implementations, graphical element 260 is adjacent to the step or substep associated with the search results, which in this example results in the graphical element 260 being placed in the same row as the step or substep.

Figure 2B:
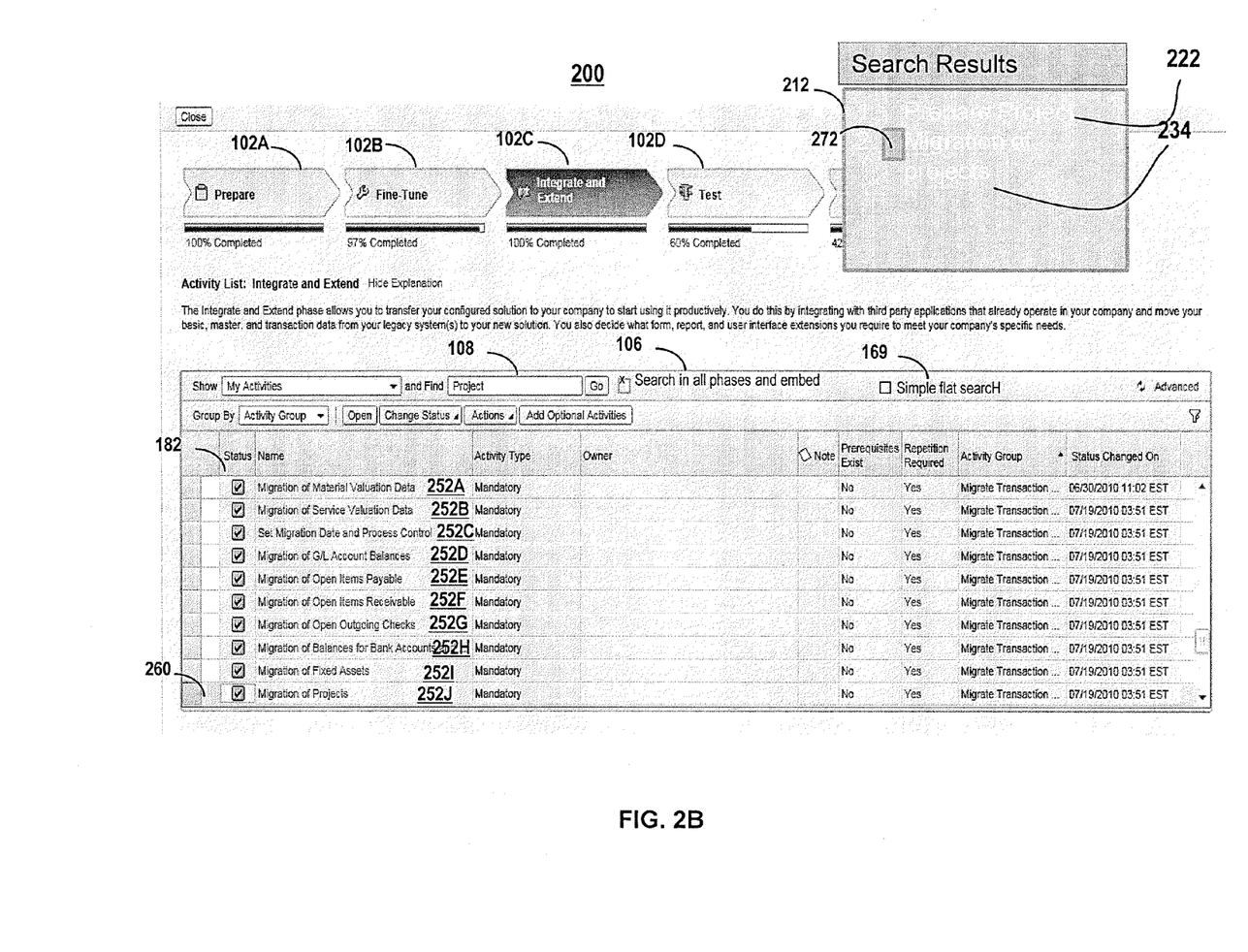

FIG. 2B depicts page 200 with the addition of a window 212 indicating all of the search results but only the search result in the step being viewed at page 200 is highlighted. For example, the search for the term "Project" across steps 102A-E results in two search results "Prepare Project" 222 and "Migration of Projects" 234. However, only "Migration of Projects" 234 is relevant to the current context of steps 102C and substeps 252A-J as indicated by graphical element 272. The other search result "Prepare Project" 222 is relevant to another step 102A currently not being viewed (or accessed) so the "Prepare Project" 222 substep is not highlighted or otherwise flagged. Accordingly, a user can see the search results 222 and 234 and understand the context of the search results with the sequence of the steps 102A-E.

Moreover, the process 252A-J may comprise a work flow, so as the user completes the substeps 252A-J, the substeps may have a status (e.g., complete, in progress, etc.) and this status may be maintained by a process monitor at the business system. In the example of FIG. 2B, the status 182 is completed by a check mark when completed. And, the substep integrate and extend 102C is 100% completed as indicated at 184 and all of the check marks at 182.

Although FIGS. 1A, 1B, 2A, and 2B are described with respect to a certain business process, any other type of business process executed by a business system, such as an enterprise resource planning (ERP) system and the like, may be used as well.

In some implementations, a user may select either a simple flat file search at 169 or an embedded context search 106. When the embedded context search is selected at 106, all of the steps of the process 102A-E are selected. Moreover, in some implementations, the graphical elements 110 and 260 are not used, but instead separate pages (or windows) are first generated and presented as in the example windows 120 and 212. Moreover, the windows 120 and/or 212 may be generated and presented programmatically to present search results and allow a user to select then an entry in the search result list. When a selection is made, such as Migration of projects 234, page 200 may be generated with a row (or portion of the row) associated with Migration of Projects 252J highlighted or otherwise flagged. Furthermore, navigation may carry directly to the relevant Migration of Projects 252J row, when this result is currently being presented on the screen. Referring again to FIG. 1B, selecting Migration of projects 124 may cause navigation (and/or generation) of page 200 at FIG. 2A. As such, a user may simultaneously decide to navigate between the different search results at different parts of the process 102A-B (at, for example, windows 120 and/or 212) or select specific entries in the user interface including search results (e.g., graphical element 110) or aspects of the process which are not part of the search results. Accordingly, the context of the process may be maintained.

Figure 3:
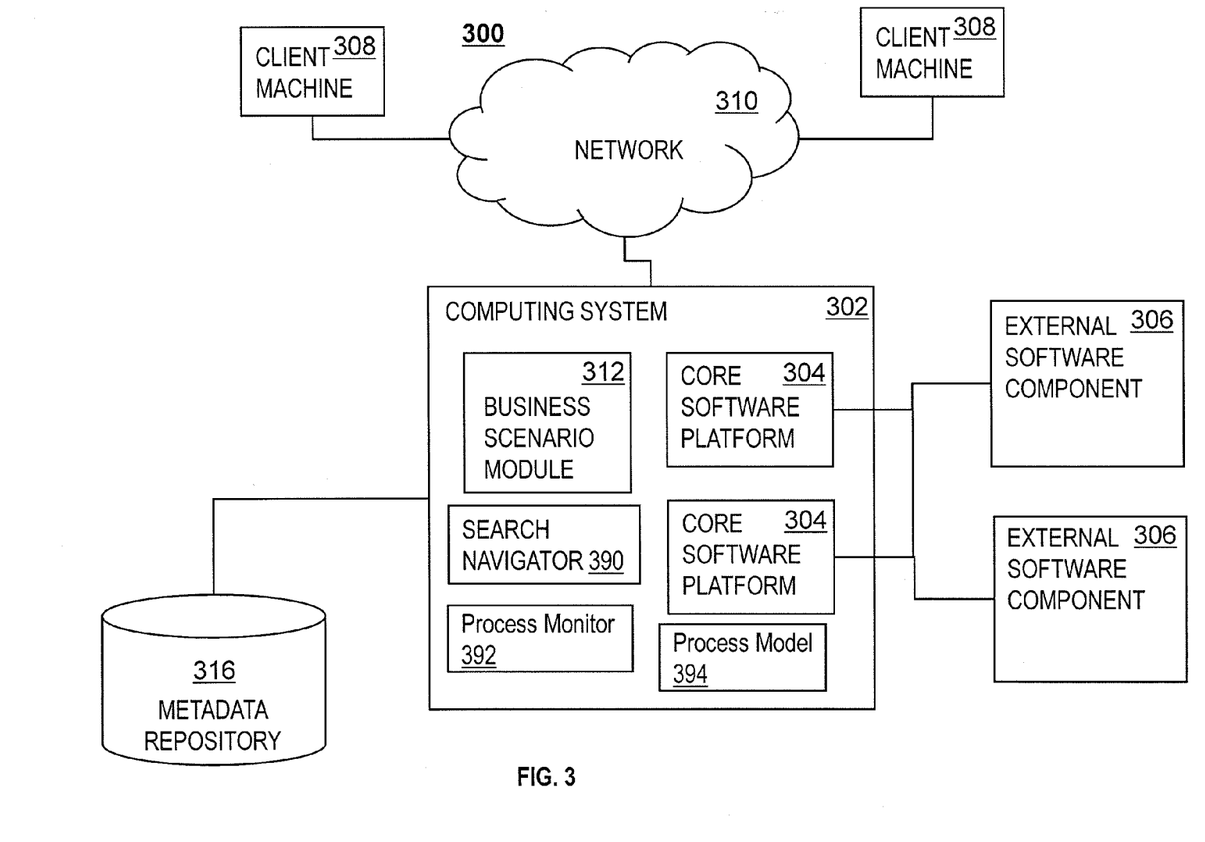
FIG. 3 is a diagram illustrating aspects of a system configured to guide a user through a complex business process while presenting embedded search results, in accordance with some example implementations.

In some example implementations, the business system comprises an enterprise resource planning system, although other types of systems may be used as well. When this is the case, the core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. FIG. 3 shows a diagram of a business system 300 consistent with such an implementation.

Referring to FIG. 3, a computing system 302 may include one or more core software platform modules 304 providing one or more features of the ERP system. The computing system 302 may also aggregate or otherwise provide a gateway via which users can access functionality provided by one or more external software components 306, which can optionally be made available from a service provider external to the core software platform modules 304.

Computing system 302 may also include a search navigator 390. The search navigator 390 may receive one or more search terms (e.g., "Project" 108) from a user interface and, when the user selects an embedded context search (e.g., by selecting 106), the search navigator 390 may search across all phases of a process. The steps and substeps of the process may be defined by a business process model 394, and the status of the process may be monitored by process monitor 392. For example, search navigator 390 may search each step and substep and associated objects based on information at business process model 394 identifying each step/substep and the objects associated with each step/substep (as well as their storage location(s)). When the search results are received, the search navigator 390 links, using the information provided by process model 394, the search results to a specific step/substeps and maintains that structural relationship, when presenting the results on a generated page, such as pages 100 and 200, as shown by the windows 120 and 212 and graphical elements 110 and 260.

Client machines 308 may access the computing system, either via a direct connection, a local terminal, or over a network 310 (e.g. a local area network, a wide area network, a wireless network, the Internet, or the like). A business process scenario guidance module 312 may be hosted on the computing system 302 or alternatively, on an external system accessible over a network connection. The business process scenario guidance module 312 may include one or more discrete software and/or hardware modules that perform the operations associated with managing, controlling, and/or implementing a business process such as those described herein. The business process scenario guidance module 312 may access one or more metadata repositories 316 and/or other data repositories that can store the metadata defining aspects of the business process as well as data relating to objects, such as concrete instances of the data objects (e.g., business objects, documents, and the like) that are relevant to a specific instance of the business process. In some examples, the definition may be stored as a business object. In some implementations, the business object may include a template definition of a standard business process. The template definition that may be modified via one or more extensions that are stored in the one or more metadata repositories 316.

Figure 4:
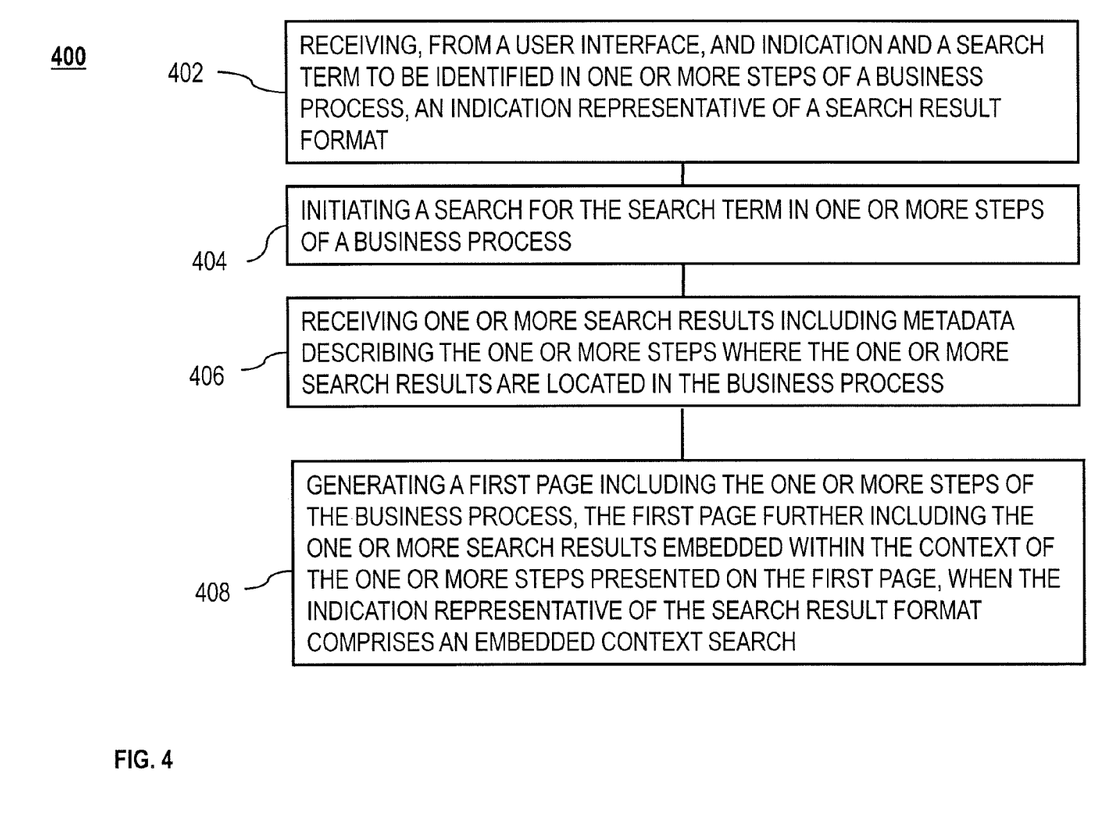
FIG. 4 is a process flow diagram for guiding a user through a complex business process while presenting embedded search results, in accordance with some example implementations.

FIG. 4 depicts a process 400 for performing an embedded context search of a business process. The description of process 400 also refers to FIGS. 1A, 1B, 2A, 2B, and 3.

At 402, an indication and a search term to be identified in one or more steps of a business process may be received from a user interface. The indication may represent a search result format. For example, the search navigator 390 may receive, from a client machine 308 hosting a user interface presenting page 100, an indication representative of whether an embedded context search 106 is selected at page 100 or some other type of search, such as search results provided as a simple flat file 169 divorced from the context of the process. The search navigator 390 may also receive, from a client machine 308 hosting a user interface presenting page 100, a search term, such as the term "Project" 108.

At 404, a search may be initiated for the search term in one or more steps of a business process. For example, search navigator 390 may access the process model 294 to obtain metadata defining the steps 102A-E and substeps 104A-E, 252A-J, and the like. This metadata may include the identity of steps/substeps, the relationships among the steps/substeps; storage locations of the steps/substeps; roles of users for each of the steps/substeps, objects, such as files, forms, business objects, and the like for the steps/substeps; and/or identity of users for each of the steps/substeps, objects, such as files, forms, business objects, and the like for the steps/substeps. The search navigator 390 may then initiate a search for the term, such as "Project," across the steps/substeps based on the metadata.

At 406, one or more search results and metadata may be received. The metadata may describe the one or more steps where the one or more search results are located in the business process. For example, search navigator 390 may receive results for the term "Project," including metadata defining where in the process including the steps/and substeps the results are found.

At 408, a first page including the one or more steps of the business process may be generated. The first page may further include the one or more search results embedded within the context of the one or more steps presented on the first page, when the indication representative of the search result format comprises an embedded context search. For example, search navigator 390 may generate page 100 including graphical indicator 110 to embed the context of the search results in the substeps 104A-E. Search navigator 390 may generate the window 120 to embed the context of the search results in the steps 102A-D, so that selecting one of Prepare Projects 122 or Migration of projects 134 navigates the user to where the search result can be found in the process. The generated page may then be sent by the search navigator 390 to a client machine including a user interface.

When the indication representative of the search result format comprises a simple search, a second page may be received. The second page may include the one or more search results without embedding the one or more search results in the context of the one or more steps presented on the page. For example, search navigator 390 may generate a page only including the search results without any data regarding the context of the overall process. The generated page may then be sent by the search navigator 390 to a client machine including a user interface.

Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services of an ERP system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes. In some implementations, this hosting of multiple tenants may be considered a so-called "cloud" implementation.

Figure 5:
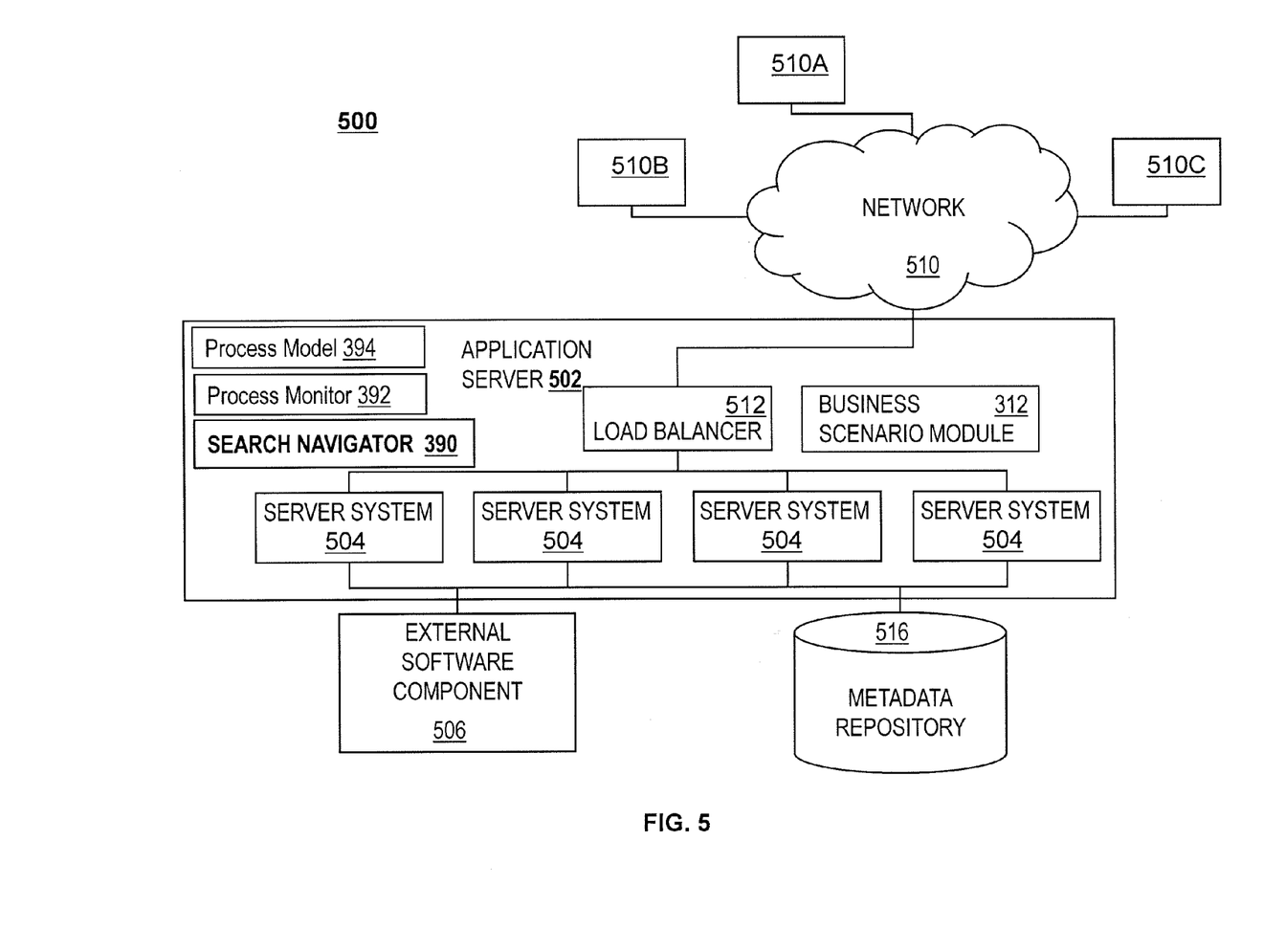
FIG. 5 is a diagram illustrating aspects of another example of a system showing features consistent with implementations of the current subject matter.

FIG. 5 shows a block diagram of a multi-tenant implementation of a software delivery architecture 500 that includes an application server 502, which can in some implementations include multiple server systems 504 that are accessible over a network 506 from client machines operated by users at each of multiple organizations 510A-510C (referred to herein as "tenants" of a multi-tenant system) supported by a single software delivery architecture 600.

For a system in which the application server 502 includes multiple server systems 504, the application server can include a load balancer 512 to distribute requests and actions from users at the one or more organizations 510A-510C to the one or more server systems 504. Instances of the core software platform 504 can be executed in a distributed manner across the server systems 504. A user can access the software delivery architecture across the network using a thin client, such as for example a web browser or the like, or other portal software running on a client machine. The application server 502 can access data and data objects stored in one or more data repositories, such as metadata repository 516. The application server 502 can also serve as a middleware component via which access is provided to one or more external software components 506 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 502 that includes multiple server systems 504 that handle processing loads distributed by a load balancer 512. Potential benefits from such an arrangement can include, but are not limited to, high and reliably continuous application server availability and minimization of unplanned downtime, phased updating of the multiple server systems 504 to permit continuous availability (one server system 504 can be taken offline while the other systems continue to provide services via the load balancer 512), scalability via addition or removal of a server system 504 that is accessed via the load balancer 512, and de-coupled lifecycle processes (such as for example system maintenance, software upgrades, etc.) that enable updating of the core software independently of tenant-specific customizations implemented by individual tenants.

As in the example illustrated in FIG. 5, the metadata repository 516 can store a business object that represents a template definition of a standard business process. The repository may also include data associated with the process models disclosed herein. Further, each individual tenant 510A-510C can customize that standard template according to the individual business process features specific to business of the organization to which that tenant is assigned. Customizations can be stored as extensions in the metadata repository. Moreover, the metadata repository 516 may be searchable to allow searches, such as searching across steps and substeps for a term or phrase as described at FIG. 1A with respect to search for the term "Project" across all phases and embed results 106.

Figure 6:
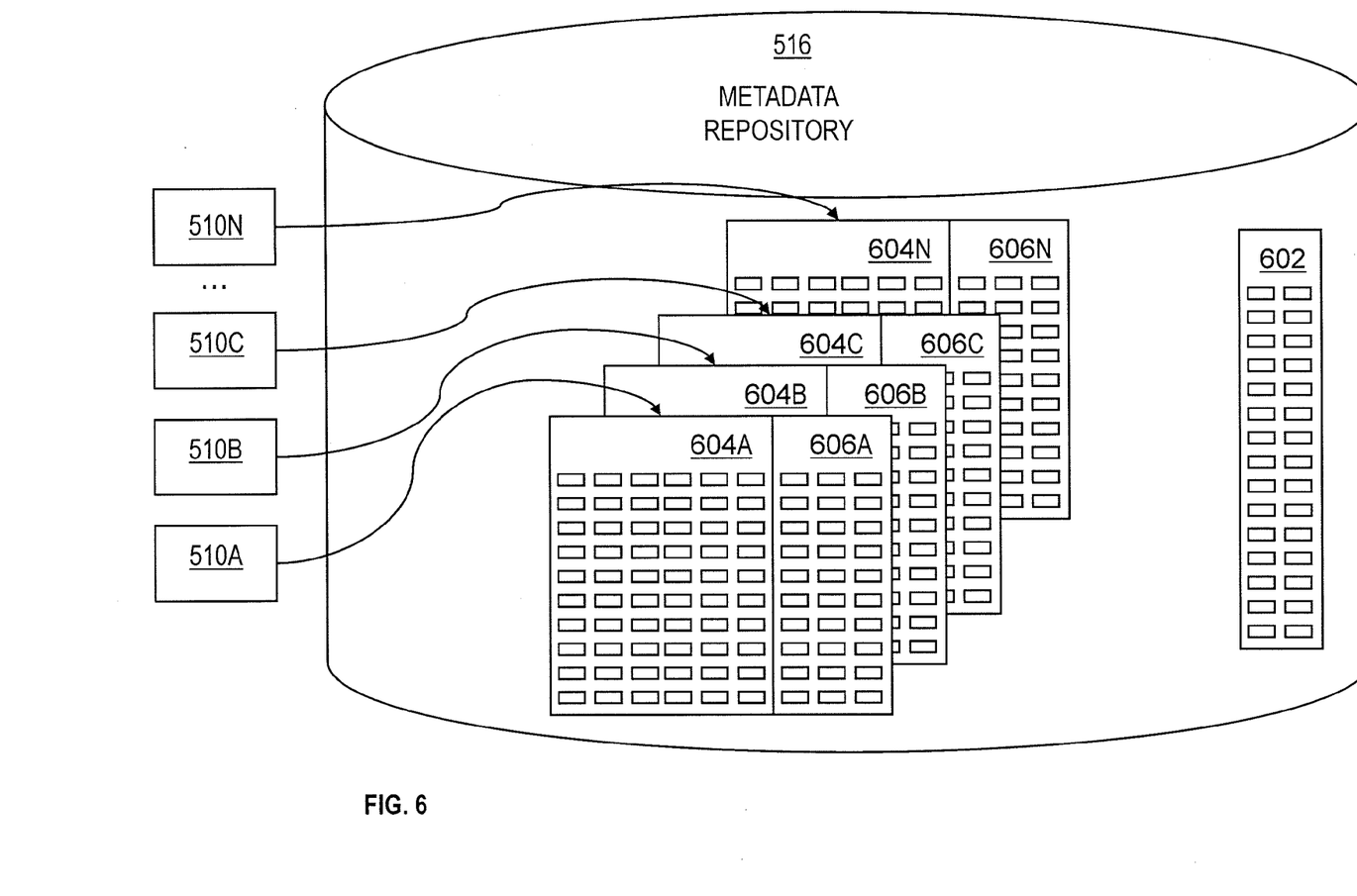
FIG. 6 is a diagram illustrating a data repository showing features consistent with implementations of the current subject matter.

To provide for customization of the business process for each of multiple organizations supported by a single software delivery architecture 500, the data and data objects stored in the metadata repository 516 and/or other data repositories that are accessed by the application server 502 can include three types of content as shown in FIG. 6: core software platform content 602 (e.g. a standard definition of a business process), system content 604 and tenant content 606. Core software platform content 602 includes content that represents core functionality and is not modifiable by a tenant. System content 604 can in some examples be created by the runtime of the core software platform and can include core data objects that store concrete data associated with specific instances of a given business process and that are modifiable with data provided by each tenant. The data retained in these data objects are tenant-specific: for example, each tenant 510A-510N can store information about its own inventory, sales order, etc. Tenant content 606A-606N includes data objects or extensions to other data objects that are customized for one specific tenant 510A-510N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 606 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 602 and system content 604 and tenant content 606 of a specific tenant are accessed to provide the business process definition and/or the status information relating to a specific instance of the business process according to customizations and business data of that tenant such that each tenant is provided access to a customized solution whose data are available only to users from that tenant. Moreover, searching across steps and substeps for a term or phrase as described at FIG. 1A with respect to search for the term "Project" across all phases and embed results 106 may include searching core software platform content 602, system content 604, and tenant content 606, although generally most searches may be limited to tenant content 606 as it is likely that the search term would be only stored therein.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer-readable medium including code that, when executed by at least one programmable processor, cause the at least one programmable processor to perform operations comprising:
    receiving, by the at least one programmable processor, an indication and a search term to be identified in one or more steps of a process, the indication received from a user interface, the indication being representative of a request to provide one or more search results in a search result format for an embedded context search;
    initiating, by the at least one programmable processor, a search for the search term in one or more steps of the process;
    receiving, by the at least one programmable processor, the one or more search results including metadata describing where the one or more search results are located in the process; and
    generating, by the at least one programmable processor, a first page including the one or more steps of the process, the first page further including the one or more search results embedded within the one or more steps to provide a context by providing, on the user interface, a graphically distinct element to indicate the one or more search results are part of the one or more steps of the process being handled at the user interface.

2. The non-transitory computer-readable medium of claim 1, wherein the user interface is configured for presentation on a display.

3. The non-transitory computer-readable medium of claim 1, wherein the embedded context search represents associating each of the one or more search results with a corresponding location in the one or more steps of the process.

4. The non-transitory computer-readable medium of claim 1, wherein the generating further comprises:
    generating a first window and a separate second window, wherein the first window includes the one or more search results, and the second window includes the one or more steps of the process including the graphically distinct element.

5. The non-transitory computer-readable medium of claim 1, wherein, when the one or more search results are not part of the one or more steps of the process being handled at the user interface, the graphically distinct element is not provided.

6. The non-transitory computer-readable medium of claim 1, wherein the graphically distinct element comprises highlighting.

7. A method comprising:
    receiving, by the at least one programmable processor, an indication and a search term to be identified in one or more steps of a business process, the indication received from a user interface, the indication being representative of a request to provide one or more search results in a search result format for an embedded context search;

initiating, by the at least one programmable processor, a search for the search term in one or more steps of the process;

receiving, by the at least one programmable processor, the one or more search results including metadata describing where the one or more search results are located in the process; and generating, by the at least one programmable processor, a first page including the one or more steps of the process, the first page further including the one or more search results embedded within the one or more steps to provide a context by providing, on the user interface, a graphically distinct element to indicate the one or more search results are part of the one or more steps of the process being handled at the user interface.

8. The method of claim 7, wherein the user interface is configured for presentation on a display.

9. The method of claim 7, wherein the embedded context search represents associating each of the one or more search results with a corresponding location in the one or more steps of the process.

10. The method of claim 7, wherein the generating further comprises:

generating a first window and a separate second window, wherein the first window includes the one or more search results, and the second window includes the one or more steps of the process including the graphically distinct element.

11. A system comprising:

at least one processor; and at least one memory including code which when executed by the at least one processor causes operations comprising:

receiving, by the at least one programmable processor, an indication and a search term to be identified in one or more steps of a process, the indication received from a user interface, the indication being representative of a request to provide one or more search results in a search result format for an embedded context search;

initiating, by the at least one programmable processor, a search for the search term in one or more steps of the process;

receiving, by the at least one programmable processor, the one or more search results including metadata describing where the one or more search results are located in the process; and generating, by the at least one programmable processor, a first page including the one or more steps of the process, the first page further including the one or more search results embedded within the one or more steps to provide a context by providing, on the user interface, a graphically distinct element to indicate the one or more search results are part of the one or more steps of the process being handled at the user interface.

12. The system of claim 11, wherein the user is configured for presentation on a display.

13. The system of claim 11, wherein the embedded context search represents associating each of the one or more search results with a corresponding location in the one or more steps of the process.

14. The system of claim 11, wherein the generating further comprises:

generating a first window and a separate second window, wherein the first window includes the one or more search results, and the second window includes the one or more steps of the process including the graphically distinct element.

* * * * *